US008813576B2

(12) United States Patent
Li

(10) Patent No.: US 8,813,576 B2
(45) Date of Patent: Aug. 26, 2014

(54) CORIOLIS MASS FLOW METER WITH MICRO-BEND TUBES

(71) Applicant: Golden Promise Equipment Inc., New York, NY (US)

(72) Inventor: Guannan Li, New York, NY (US)

(73) Assignee: Golden Promise Equipment Inc., New York, NY (US)

( * ) Notice: Subject to any disclaimer, the term of this patent is extended or adjusted under 35 U.S.C. 154(b) by 171 days.

(21) Appl. No.: 13/687,139

(22) Filed: Nov. 28, 2012

(65) Prior Publication Data
US 2014/0144250 A1    May 29, 2014

(51) Int. Cl.
*G01F 1/84*    (2006.01)
(52) U.S. Cl.
CPC .................... *G01F 1/8472* (2013.01)
USPC .................................. 73/861.355

(58) Field of Classification Search
USPC ...................... 73/861.355–861.357
See application file for complete search history.

(56) References Cited

U.S. PATENT DOCUMENTS

| 4,768,385 A | * | 9/1988 | Cage ..................... 73/861.355 |
| 5,551,307 A | * | 9/1996 | Kane et al. ............ 73/861.356 |

* cited by examiner

*Primary Examiner* — Jewel V Thompson
(74) *Attorney, Agent, or Firm* — Troutman Sanders LLP

(57) ABSTRACT

A new type of coriolis mass flow meter is disclosed. In one embodiment, the coriolis mass flow meter comprises two or more flow splitters, each flow splitter being connected to two or more flow tubes; and one or more supporting pipes connecting the flow splitters. The one or more of the flow splitters have a smooth round corner with a 65° turning angle. The distance between the centers of the two or more splitter tubes is about 1.1 to 1.2 times dT, where dT is the inner diameter of each splitter tube. The splitting turning radius RT is about 1 to 2.5 times DN; where DN is inner diameter of the flange portion of the flow splitter. The inner diameter of each splitter tube is about 0.8 to 0.85 times DN/√2.

4 Claims, 4 Drawing Sheets

CORIOLIS MASS FLOW METER WITH MICRO-BEND TUBES

FIELD OF THE INVENTION

This invention relates to the structure of Coriolis mass flow meter (Hereafter, "Coriolis flow meter").

BACKGROUND OF THE INVENTION

Coriolis flow meter can be categorized into straight tube type and curved tube type according to the flow tube shape. For the straight pipe type flow meter with single-tube structure or double-tube structure, the strain which is caused by the tube expansion when heated and the change of the working pressure is very hard to compensate. This could lead to the worse repeatability and lower accuracy. Thus the straight pipe type Coriolis flow meter can be hardly used under the condition that varies greatly in temperature and pressure.

The curved tube type coriolis flow meter adopts tube of different shapes, including U-shape, Δ-shape, Ω-shape, single spiral shape etc. The coriolis flow meter with Δ-shaped, Ω-shaped or single spiral shaped flow tube is not widely used, because the flow tube of those shapes is longer or with relatively small inner turning angle. As a result, the pressure loss is larger, the shaping of the flow tube is harder, and the measured range is shorter. The popular U-shaped configuration also has some disadvantage, such as comparatively high pressure loss, low working frequency, and relatively large in size.

There is therefore a need for a new type of flow tube which avoids the drawback of the straight tube type, and is greatly improved compared with other curved tube type Coriolis flow meter.

OVERVIEW OF THE INVENTION

One embodiment of the present invention includes a Coriolis flow meter, comprising: two or more flow splitters, each flow splitter being connected to two or more flow tubes; and one or more supporting pipes connecting the flow splitters. The one or more of the flow splitters have a smooth round corner with a 65° turning angle. The distance between the centers of the two or more flow tubes is about 1.1 to 1.2 times dT, where dT is the inner diameter of each splitter tube. The splitting turning radius RT is about 1 to 2.5 times DN; where DN is inner diameter of the flange portion of the flow splitter. The inner diameter of each splitter tube is about 0.8 to 0.85 times DN/√2.

In another embodiment, the Coriolis flow meter comprises one or more of the flow tubes that are trapezoid-shaped and make a 65° turn at the bottom bending corner with a corner radius of about 3 times the inner diameter of each splitter tube.

In yet another embodiment, the connection between the flow splitter and the flow tube is plug connection.

In yet another embodiment, the Coriolis flow meter further comprises two or more damping sheets welded on the end portions of two or more flow tubes.

BRIEF DESCRIPTIONS OF THE DRAWINGS

Figure 1:
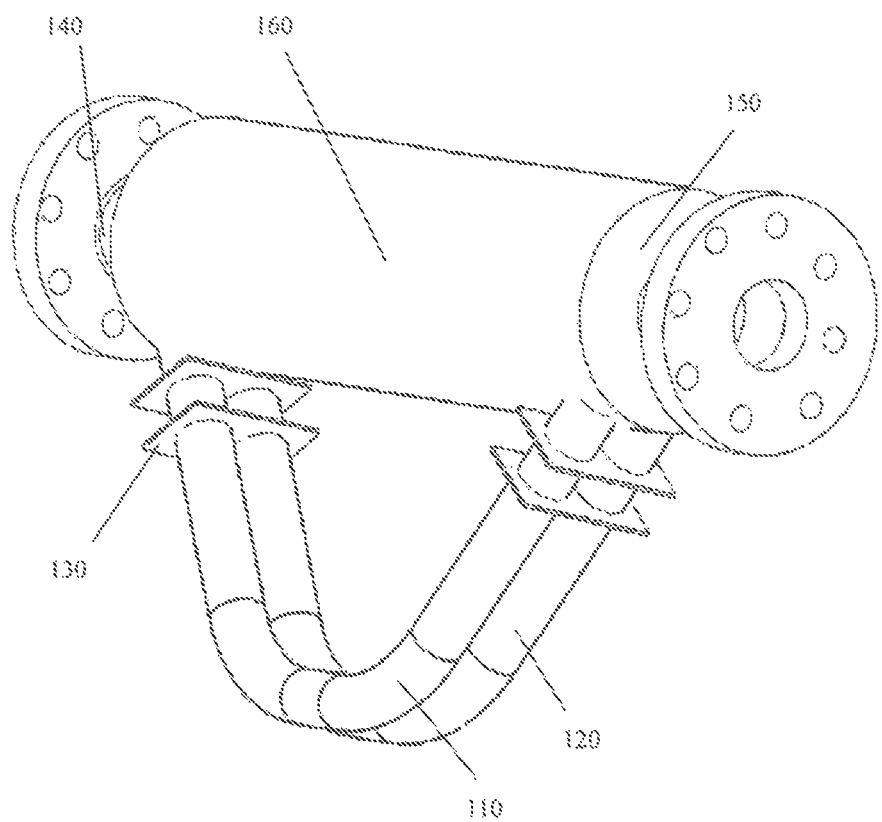

FIG. 1 schematically depicts the overall structure of the Coriolis flow meter according to one embodiment of the invention.

Figure 2:
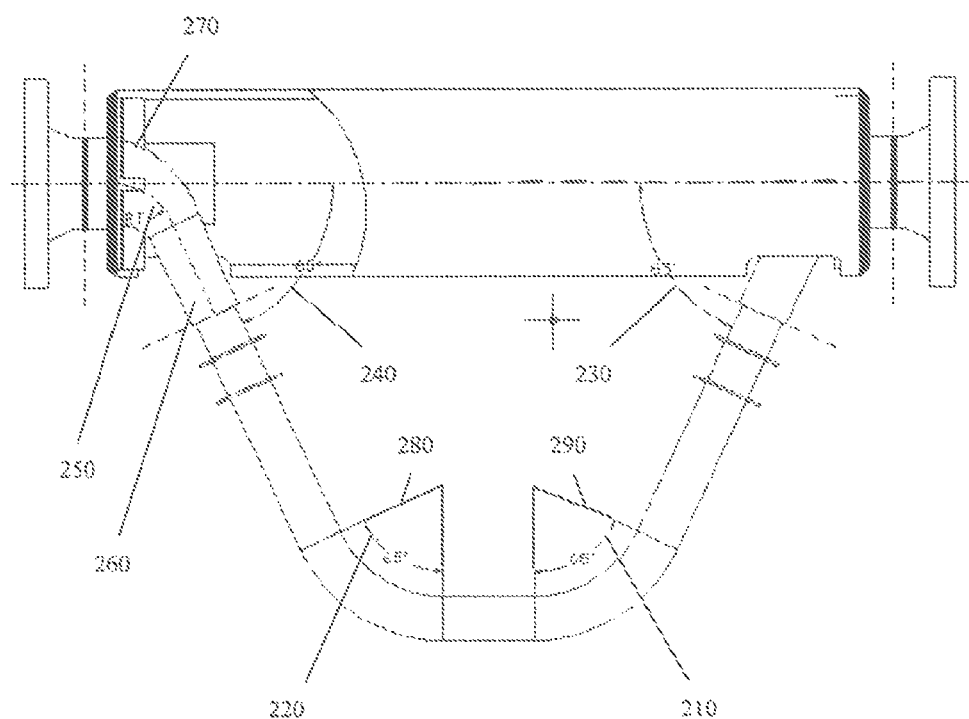

FIG. 2 schematically depicts a cross-section view of the Coriolis flow meter according to one embodiment of the invention.

Figure 3:
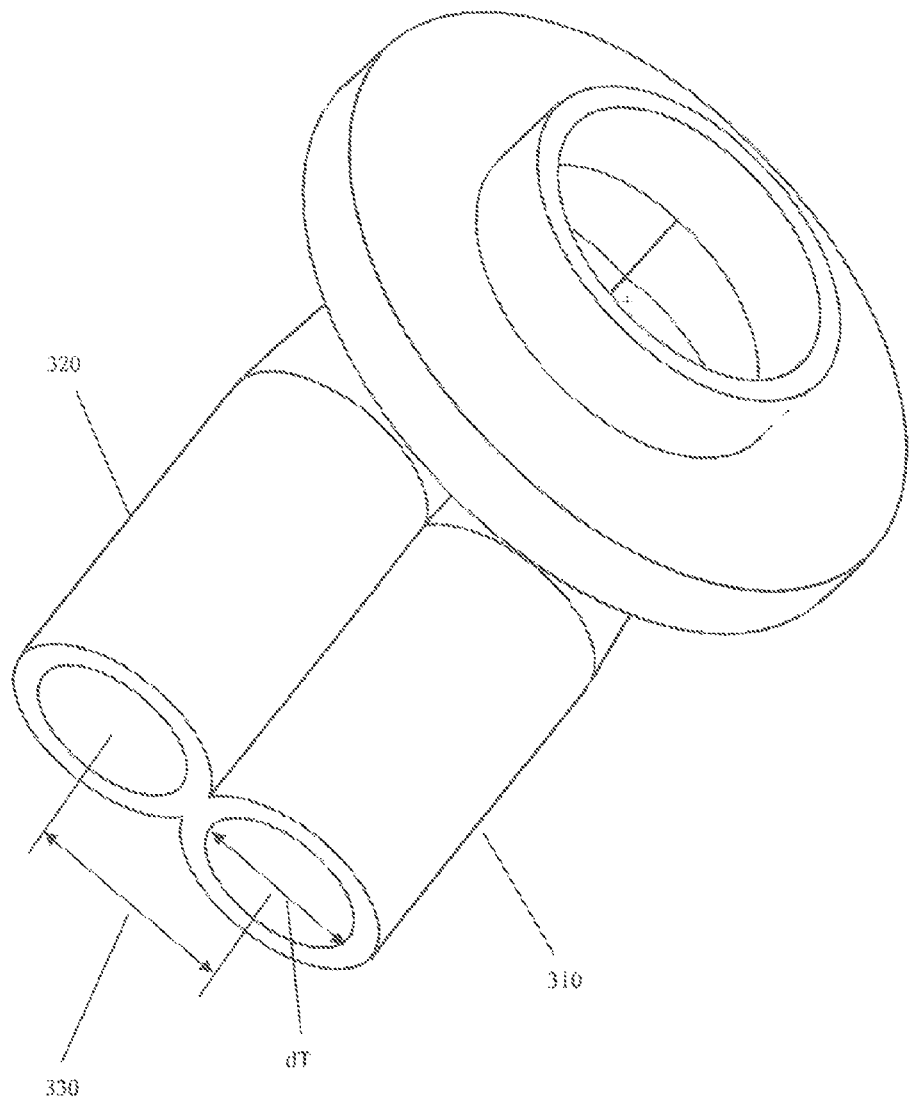

FIG. 3 schematically depicts a flow splitter according to one embodiment of the invention.

Figure 4:
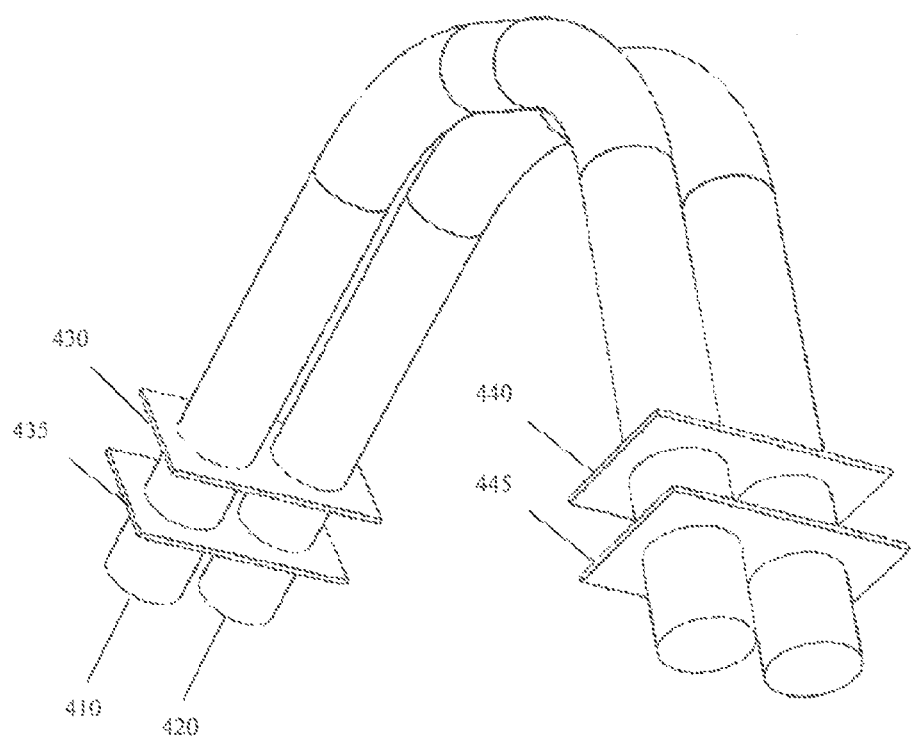

FIG. 4 schematically depicts a flow tube structure according to one embodiment of the invention.

DETAILED DESCRIPTION OF THE INVENTION

The overall structure of the Coriolis flow meter according to one embodiment of the invention is shown in FIG. 1. In this embodiment, flow tubes 110 and 120 are connected to flow splitters 140 and 150. The connections between the flow splitters and the flow tubes may be plug connection. The flow tubes 110 and 120 are bended to a "micro-bend" shape. A "micro-bend" shape usually means a pipe with bending angle less than 90 degrees. These micro-bend shapes provide a lower pressure loss, higher working frequency, higher sensitivity, and smaller size than conventional shapes. A supporting pipe 160 connects between the flow splitters 140 and 150. In addition, two or more square-shaped damping sheets 130 may be fixed on the end portions of the flow tubes 110 and 120. In FIG. 1's embodiment, there are two damping sheets on each end portion of the flow tubes.

As can be seen from FIG. 1's embodiment, the fluid may first flow through the flow splitter 140, and then flow through the micro-bend flow tubes 110 and 120, and finally flow through the flow splitter 150. The damping sheets 130 are placed at the proper position on the flow tubes 110 and 120 to effectively reduce the transmission of vibration between flow splitters and the sensor part. As a result, the damping sheets will minimize the outer interference on the sensor and ensure the normal measurement.

A cross-section view of the Coriolis flow meter according to one embodiment of the invention is shown in FIG. 2. In this embodiment, the flow tubes are bended in such a way that the "bending angles" of the flow tubes 210, 220, 230 and 240 are 65 degrees. In addition, the radius RT at the turning portion 250 of the flow splitter is about 1 to 2.5 times DN, where DN is the inner diameter of the flange portion 270 of the flow splitter. The inner diameter of each splitter tube 260 of the flow splitter is about 0.8 to 0.85 times DN/√2. The radius 280 and 290 of the "bending corners" corresponding to bending angles 210 and 220 may be about 3 times the inner diameter of each splitter tube.

A flow splitter according to one embodiment of the invention is shown in FIG. 3. In this embodiment, the flow splitter comprises two splitter tubes 310 and 320. The distance 330 between the centers of the two splitter tubes of the flow splitter is about 1.1 to 1.2 times dT, where dT is the inner diameter of at least one of the splitter tubes, as shown in FIG. 3.

A flow tube structure according to one embodiment of the invention is shown in FIG. 4. The flow tube structure in this embodiment comprises two flow tubes 410 and 420. These flow tubes are bended to trapezoid-shaped. The damping sheets 430-445 are placed at the proper position on the flow tubes 410 and 420 to effectively reduce the transmission of vibration between flow splitters and the sensor part.

The embodiments described above are just examples of implementing the invention and they shall not be used to limit the scope of the invention. Any revision or replacement within the spirit and principle of the invention shall be included in the scope of protection of this application.

What is claimed is:

1. A Coriolis flow meter, comprising:
   two or more flow splitters, each flow splitter being connected to two or more flow tubes; and
   one or more supporting pipes connecting the flow splitters, wherein:
one or more of the flow splitters have a smooth round corner with a 65° bending angle;
the distance between the centers of the two or more flow tubes is about 1.1 to 1.2 times dT, where dT is the inner diameter of each splitter tube;
the splitting turning radius RT is about 1 to 2.5 times DN; where DN is inner diameter of the flange portion of the flow splitter; and
the inner diameter of each splitter tube is about 0.8 to 0.85 times $DN/\sqrt{2}$.

2. The Coriolis flow meter of claim 1, wherein one or more of the flow tubes are trapezoid-shaped and make a 65° turn at the bottom bending corner with a corner radius of about 3 times the inner diameter of each splitter tube.

3. The Coriolis flow meter of claim 2, wherein the connection between the flow splitter and the flow tube is plug connection.

4. The Coriolis flow meter of claim 1, further comprising two or more damping sheets welded on the end portions of two or more flow tubes.

\* \* \* \* \*